United States Patent
Schlabach et al.

(10) Patent No.: US 6,810,406 B2
(45) Date of Patent: Oct. 26, 2004

(54) METHOD AND SYSTEM FOR SERVICING A SELECTED PIECE OF EQUIPMENT HAVING UNIQUE SYSTEM CONFIGURATIONS AND SERVICING REQUIREMENTS

(75) Inventors: James Edward Schlabach, Erie, PA (US); Nabeel Ahmed Zuberi, Erie, PA (US)

(73) Assignee: General Electric Company, Erie, PA (US)

(*) Notice: Subject to any disclaimer, the term of this patent is extended or adjusted under 35 U.S.C. 154(b) by 162 days.

(21) Appl. No.: 09/839,863

(22) Filed: Apr. 20, 2001

(65) Prior Publication Data

US 2002/0059270 A1 May 16, 2002

Related U.S. Application Data

(63) Continuation-in-part of application No. 09/644,421, filed on Aug. 23, 2000.
(60) Provisional application No. 60/258,747, filed on Dec. 29, 2000.

(51) Int. Cl.[7] .............................................. G06F 17/30
(52) U.S. Cl. .............................. 707/201; 707/1; 707/10; 700/108
(58) Field of Search .................... 707/1–10, 100–104.1, 707/200–206; 700/2, 108–111, 80, 97, 100; 702/183–185; 705/8–9

(56) References Cited

U.S. PATENT DOCUMENTS

| 4,012,848 A | 3/1977 | Diament et al. |
| 4,404,639 A | 9/1983 | McGuire et al. |
| 4,697,243 A | 9/1987 | Moore et al. |
| 4,776,798 A | 10/1988 | Crawford |
| 4,783,740 A | 11/1988 | Ishizawa et al. |
| 4,890,102 A | 12/1989 | Oliver |

(List continued on next page.)

FOREIGN PATENT DOCUMENTS

| WO | WO 01/30632 A1 | 5/2001 |
| WO | WO 01/82136 A2 | 11/2001 |

*Primary Examiner*—Shahid Alam
*Assistant Examiner*—Jean Bolte Fleurantin
(74) *Attorney, Agent, or Firm*—Carl A. Rowold, Esquire; Terry M. Sanks, Esquire; Beusse Brownlee Wolter Mora & Maire, P.A.

(57) ABSTRACT

Computerized method and system for servicing a selected piece of equipment made up of a plurality of systems and subject to unique system configurations and servicing requirements are provided. The method allows to respectively provide a database including detailed system configuration data regarding a selected piece of equipment, and a database including service modules for facilitating the servicing of equipment of a group of equipment that includes a selected piece of equipment. The method further allows to provide a respective identifier for uniquely identifying any selected equipment, and an input/output device to communicate with the databases. Respective accessing steps allow to access the database having configuration data to interface with the detailed system configuration data, and the database having the service modules to interface with at least one of the service modules. Configuration data about the selected equipment, using the respective identifier for the equipment, is communicated from the database including detailed system configuration data to the input/output device, wherein service personnel at a service site may access the detailed configuration data to select a service action appropriate for the system configuration of the selected piece of equipment, and may access a service module for the system configuration of the selected piece of equipment to facilitate taking such service action.

20 Claims, 10 Drawing Sheets

U.S. PATENT DOCUMENTS

| | | |
|---|---|---|
| 4,943,238 A | 7/1990 | Gregorio |
| 5,025,964 A | 6/1991 | Phirippidis |
| 5,107,499 A | 4/1992 | Lirov et al. |
| 5,111,391 A | 5/1992 | Fields et al. |
| 5,147,206 A | 9/1992 | Golenski |
| 5,204,821 A | 4/1993 | Inui et al. |
| 5,216,612 A | 6/1993 | Cornett et al. |
| 5,273,434 A | 12/1993 | Peck |
| 5,280,223 A | 1/1994 | Grabowski et al. |
| 5,373,219 A | 12/1994 | Grabowski et al. |
| 5,548,714 A | 8/1996 | Becker |
| 5,608,621 A | 3/1997 | Caveney et al. |
| 5,623,404 A | 4/1997 | Collins et al. |
| 5,657,233 A | 8/1997 | Cherrington et al. |
| 5,664,110 A | 9/1997 | Green et al. |
| 5,717,595 A | 2/1998 | Cherrington et al. |
| 5,778,381 A | 7/1998 | Sandifer |
| 5,786,998 A | 7/1998 | Neeson et al. |
| 5,825,651 A | 10/1998 | Gupta et al. |
| 5,867,801 A | 2/1999 | Denny |
| 5,902,985 A | 5/1999 | Bos et al. |
| 5,903,626 A | 5/1999 | Iglehart et al. |
| 5,913,914 A | 6/1999 | Kemner et al. |
| 5,920,846 A * | 7/1999 | Storch et al. .................. 705/7 |
| 5,922,040 A | 7/1999 | Prabhakaran |
| 5,931,877 A | 8/1999 | Smith et al. |
| 5,946,521 A | 8/1999 | Budnik et al. |
| 5,961,560 A | 10/1999 | Kemner |
| 5,961,561 A | 10/1999 | Wakefield, II |
| 5,978,717 A | 11/1999 | Ebersohn et al. |
| 6,026,393 A | 2/2000 | Gupta et al. |
| 6,052,631 A | 4/2000 | Busch et al. |
| 6,067,486 A | 5/2000 | Aragones et al. |
| 6,070,155 A | 5/2000 | Cherrington et al. |
| 6,072,481 A | 6/2000 | Matsushita et al. |
| 6,115,656 A | 9/2000 | Sudolsky |
| 6,115,691 A | 9/2000 | Ulwick |
| 6,122,575 A | 9/2000 | Schmidt et al. |
| 6,138,056 A | 10/2000 | Hardesty et al. |
| 6,167,333 A | 12/2000 | Gehlot |
| 6,170,742 B1 | 1/2001 | Yacoob |
| 6,182,048 B1 | 1/2001 | Osborn et al. |
| 6,216,108 B1 | 4/2001 | LeVander |
| 6,219,597 B1 | 4/2001 | Longere |
| 6,240,365 B1 | 5/2001 | Bunn |
| 6,260,048 B1 | 7/2001 | Carpenter et al. |
| 6,263,265 B1 | 7/2001 | Fera |
| 6,263,266 B1 | 7/2001 | Hawthorne |
| 6,263,322 B1 | 7/2001 | Kirkevoid et al. |
| 6,438,535 B1 * | 8/2002 | Benjamin et al. ............... 707/2 |

* cited by examiner

METHOD AND SYSTEM FOR SERVICING A SELECTED PIECE OF EQUIPMENT HAVING UNIQUE SYSTEM CONFIGURATIONS AND SERVICING REQUIREMENTS

This applc is a CIP of Ser. No. 09/644,421 Aug. 23, 2000 and claims benefit of No. 60/258,747 Dec. 29, 2000.

BACKGROUND OF THE INVENTION

This invention relates to method and system for servicing generally complex equipment, and, more particularly, to computer-based method and system for servicing a selected piece of equipment made up of a plurality of systems, and subject to unique system configurations and servicing requirements.

The diagnosis, maintenance, and repair of generally complex equipment, such as mobile assets including on-road or off-road vehicles, ships, airplanes, railroad locomotives, trucks, and other forms of complex equipment including industrial equipment, consumer appliance equipment, medical imaging equipment, equipment used in industrial processes, telecommunications, aerospace applications, power generation, etc., involves extremely complex and time consuming processes. In the case of transportation equipment, efficient and cost-effective operation of a fleet of vehicles necessitates a reduction in the number of vehicle road failures and minimization of vehicle down-time. This can be accomplished by predicting impending failures, by performing preventative maintenance, and by performing repairs quickly and accurately. For example, it will be appreciated that the ability to predict failures before they occur allows for performing condition-based maintenance. Such maintenance can be conveniently scheduled based on statistically and probabilistically meaningful vehicle status information, instead of performing the maintenance regardless of the actual condition of a respective system, subsystem, assembly, subassembly, part, etc., such as would be the case if the maintenance is routinely performed independent of whether any of the foregoing structures actually requires the maintenance.

The conventional diagnosis and repair process for most vehicles and other generally complex equipment is based on the experience of the service technician, using paper-based information describing the structure and operation of the equipment, and performance records maintained in a log. Examining the log entries, experienced service technicians can use their accumulated experience and training in mapping incidents occurring in locomotive systems, subsystems, assemblies, subassemblies, etc., to problems that may be causing these incidents. For simple problems, this process works well. However, if the problem is complex and the root cause difficult to discern, the experienced technician may be unable to identify the problem and certainly much less likely to prognosticate problems before they occur.

Various equipment often incorporates diagnostic controls and sensors that report faults when anomalous operating conditions of the equipment arise. Typically, to diagnose the problem, a technician will study the fault log to identify the nature of the problem and determine whether a repair is necessary. While the fault log can provide some diagnosis and repair information, the technician also relies substantially on his prior experiences with the equipment, or others like it, to make a full diagnosis.

To conduct the repair, the technician uses block diagrams, exploded diagrams, parts lists, assembly drawings, schematics, etc. The repair information may be applicable only to a specific equipment by model number; the repair information will generally not be unique to the specific equipment undergoing repair. It will be apparent that as the complexity of the equipment increases, the amount of paper needed to describe the equipment to assist with the repair process likewise increases. Again, the technician will rely on his experiences with the equipment, and others like it, to perform the repair.

Yet another problem with a paper-based system is the variety of field-deployed equipment configurations, each having its own unique technical support documentation. In the case of locomotives, even for a specific model (identified by a model number), there may be several locomotive configurations as locomotive subsystems were redesigned or changed during the model production run. Thus, in a sense, no two locomotives are the same. Adding this configuration complexity to a paper-based system presents an inordinately complex and unmanageable problem of locating the correct technical repair documentation for a specific locomotive.

Another repair issue involving complex equipment, such as railroad locomotives or other mobile or stationary assets, is the unavailability of a repair history from which one could predict component failures and undertake preventative maintenance beforehand. Technicians with wide ranging and lengthy experiences may be able to predict a component failure and repair it to avoid a breakdown during operation, in some limited situations.

One tool available for locomotive repair manually downloads fault logs from a locomotive while it is parked at a maintenance facility. These fault logs are then uploaded to the railroad maintenance service center. The tool also includes standardized helpful hints for repair tasks and fault analysis descriptors based on single failure faults. Although such a device represents an improvement over a paper-based system, it falls short of the informational needs for a complex equipment, such as a locomotive, and fails to advantageously utilize the various technologies available for more efficiently predicting and performing the repair.

The techniques of the present invention in one aspect thereof may be useful for servicing complex equipment having multiple configurations. For example, while locomotives are routinely sold under particular model numbers, each locomotive is typically customized for a particular application or customer. Consequently, when a user needs to identify service actions, such as troubleshooting, training, replacement parts, etc., or check on upgrades for a particular locomotive, it is often difficult for that user to particularly identify the needed service or upgrade without knowing more about the particular locomotive. In many instances, the user may not know the particular configuration or level of upgrade of a locomotive that is in use. Thus, it would be advantageous for service personnel to have access via a communications network to detailed information concerning the configuration or upgrade status of any selected equipment that may be ready to undergo a servicing activity.

BRIEF SUMMARY OF THE INVENTION

Generally, the present invention fulfills the foregoing needs by providing in one aspect thereof a computerized method for servicing a selected piece of equipment made up of a plurality of systems and subject to unique system configurations and servicing requirements. The method allows to respectively provide a database including detailed system configuration data regarding a selected piece of equipment, and a database including service modules for facilitating the servicing of equipment of a group of equipment that includes a selected piece of equipment. The method further allows to provide a respective identifier for uniquely identifying any selected equipment, and an input/output device to communicate with the databases. Respective accessing steps allow to access the database having configuration data to interface with the detailed system configuration data, and the database having the service modules to interface with at least one of the service modules. Configuration data about the selected equipment, using the respective identifier for the equipment, is communicated from the database including detailed system configuration data to the input/output device, wherein service personnel at a service site may access the detailed configuration data to select a service action appropriate for the system configuration of the selected piece of equipment, and may access a service module for the system configuration of the selected piece of equipment to facilitate taking such service action.

The present invention further fulfills the foregoing needs by providing in another aspect thereof, a computerized system for servicing a selected piece of equipment made up of a plurality of systems and subject to unique system configurations and servicing requirements. The system comprises a database including detailed system configuration data regarding a selected piece of equipment. The database being responsive to a respective identifier for uniquely identifying any selected equipment. The system further comprises a database including service modules for facilitating the servicing of equipment of a group of equipment that includes a selected piece of equipment. An input/output device is configured to communicate with the databases for accessing the database having configuration data to interface with the detailed system configuration data, and for accessing the database having the service modules to interface with at least one of the service modules. Configuration data about the selected equipment, using the respective identifier for the equipment, is communicated from the database including detailed system configuration data to the input/output device. In particular, service personnel at a service site may access the detailed configuration data to select a service action appropriate for the system configuration of the selected piece of equipment, and may access a service module for the system configuration of the selected piece of equipment to facilitate taking such service action.

BRIEF DESCRIPTION OF THE DRAWINGS

The present invention can be more easily understood and the further advantages and uses thereof more readily apparent, when considered in view of the description of various exemplary embodiments and the following figures in which.

DETAILED DESCRIPTION OF THE INVENTION

Figure 1:
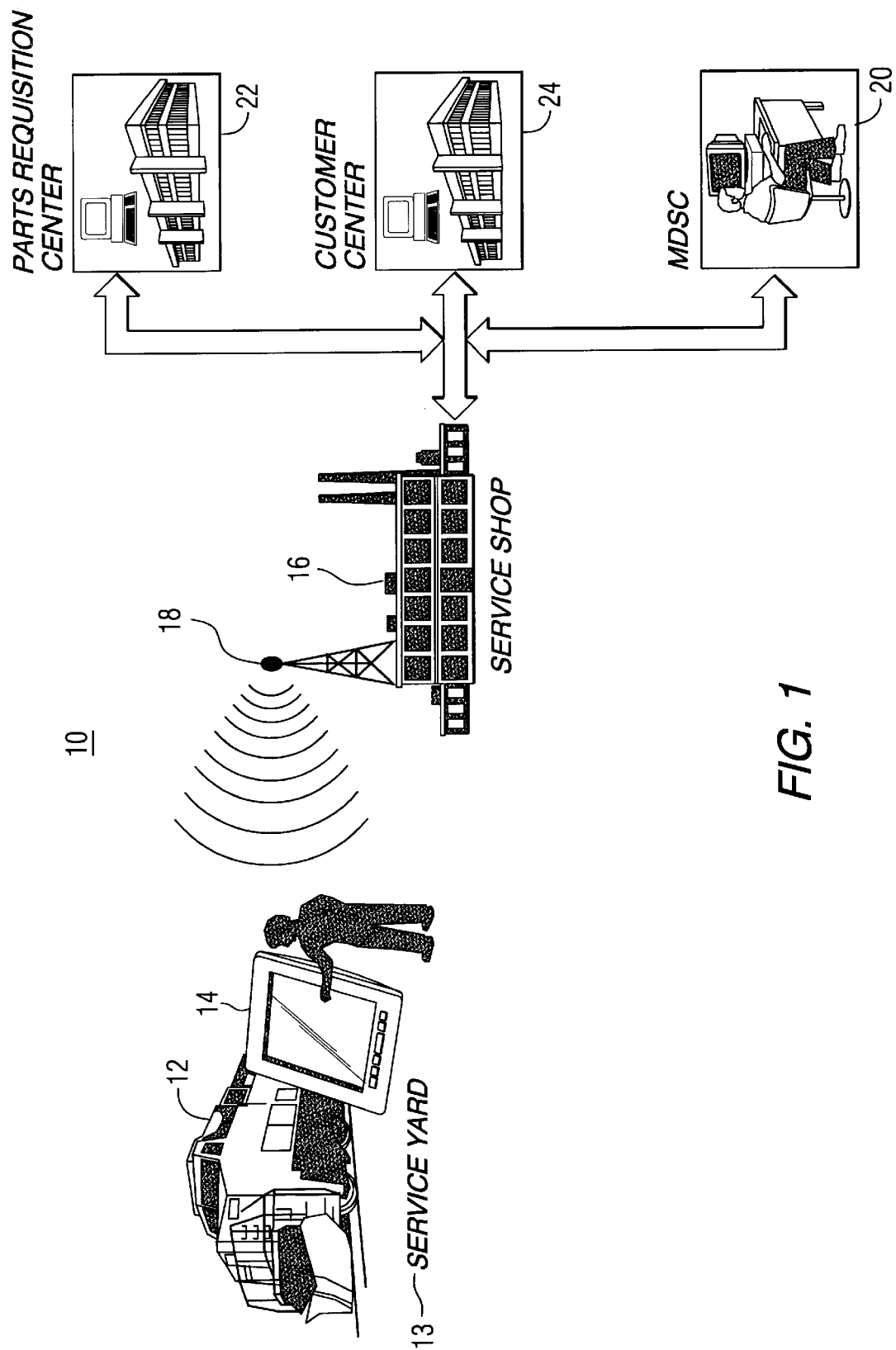
FIG. 1 is a pictorial rendering of an exemplary system that may be used for practicing aspects of the present invention.

Before describing in detail various aspects of the present invention, it should be observed that the present invention broadly comprises a novel combination of processing steps/actions and/or hardware/software configured to quickly and reliably meet the servicing needs of generally complex equipment that may comprise multiple generally interrelated systems, assemblies, subassemblies, parts, etc. Accordingly, these processing steps/actions and hardware/software components have been represented by generic processes and elements in the drawings, showing only those specific details that are pertinent to the present invention, so as not to obscure the disclosure with structural details or operational interrelationships that will be readily apparent to those skilled in the art having the benefit of the description herein.

FIG. 1 is a schematic representation of an exemplary system that may benefit from the techniques of the present invention. Although illustrated and described with respect to a railroad locomotive 12, those skilled in the art will understand that the teachings of the present invention are applicable to many types of equipment, including those which may be part of a large fleet, such as trucks, ships, off-road vehicles, airplanes, etc. The locomotive 12, such as may be parked at a railroad service yard 13, may be serviced by a technician or other service personnel holding a portable unit 14. In one embodiment, the portable unit 14 communicates with a railroad service shop 16 including an antenna 18 via any of various well-known wireless or wired communication systems and protocols, including an Internet connection using the TCP/IP protocols, tone modems, ISDN or XDSL protocols over the public switched telephone network or a cable modem. In one exemplary embodiment, access may be provided to information gathered at a monitoring and diagnostic service center 20 (MDSC) via a communications network, such as the Internet. It will be appreciated that other network configurations may be used. For example, an intranet including the portable unit 14, the service shop 16 and the MDSC 20 can be used to provide communications between these devices. It will be appreciated that the present invention is not limited to embodiments interconnected to the MSDC 20 since many of the techniques of the present invention can be implemented independently of MSDC 20. It will be further appreciated that the techniques of the present invention are not limited to embodiments using a portable unit since it is contemplated that other communication or input/output device, such as a kiosk, computer terminal, or other computer peripherals may be used for enabling the various communications interrelationships described below.

Repair, maintenance, and diagnostic information is exchanged between the portable unit 14 and the MSDC 20 via the railroad service shop 16. Parts information is exchanged between the portable unit 14 and a parts requisition center 22. Further, contractual information, such as warranty information, is exchanged with a customer center 24. Generally, the parts requisition center 22, the customer center 24, and the MDSC 20 are located remote from the service shop 16 and the service yard 13. The requisition center 22, the customer center 24, the MDSC 20, and the service shop 16 may be linked via a global information network, such as the Internet and the World Wide Web, via an intranet or by point-to-point communications system, examples of which are discussed above. Because the Internet provides the ability to communicate data and information in a multimedia format, it is especially useful for communicating and displaying the large amount of data associated with the repair, maintenance and diagnosis of the locomotive 12.

Note that in another embodiment, the portable unit 14 can communicate directly (via a wired or wireless system using any of the communications techniques discussed above) with the parts requisition center 22, the customer center 24 and the MDSC 20, rather than communicating through the service shop 16. The portable unit 14 can also interrogate an on-board monitoring and diagnostic system (not specifically shown in FIG. 1) of the locomotive 12. The on-board monitoring and diagnostic system is described in detail in the patent application entitled "On-Board Monitor for a Railroad Locomotive", application Ser. No. 09/696,368, filed on Oct. 25, 2000, which is assigned to the owner of the present invention. The on-board monitor monitors certain operational parameters on the locomotive 12 and reports faults and anomalous conditions directly to the MDSC 20 via an independent communications system, as described in the aforementioned patent application.

While at the locomotive, the technician, using his portable unit 14, has access to a plethora of repair, diagnostic, and operational information needed to efficiently and accurately trouble shoot locomotive problems and undertake the necessary repairs. The portable unit 14 downloads repair recommendations generated by analysis software and/or locomotive repair experts at the MDSC 20. From the portable unit 14, the technician also has access to repair resources, such as repair manuals, field modification instructions, schematics, block diagrams, etc. Special software tools related to the repair task are also available at the portable unit 14, as transmitted from the diagnostic service center 20. The portable unit 14 allows easy and seamless integration of the repair recommendation with the railroad's work order system as managed and controlled at the service shop 16. The system provides parts ordering and parts tracking via communications with the parts requisition center 22. Repair experts at the monitoring and diagnostic service center 20 can also provide individualized assistance to the technician via the portable unit 14, using an instant messaging feature incorporated therein. Problem resolution suggestions and repair actions can be created prior to access by the repair technician or they can be authored in real time by experts at the monitoring and diagnostic service center 20 and immediately transmitted to the portable unit 14. The repair technician can also provide visual information back to the monitoring and diagnostic center 20 (over an Internet connection, for example) using a camera attached to the portable unit 14. Still or video images can be provided by such a camera. The video information may also be accompanied by live audio information (as spoken by the technician), thereby allowing the technician to communicate with personnel at the monitoring and diagnostic service center 20 to confer about a particular problem or repair action. In those cases where the locomotive components include a bar code for encoding certain features or characteristics of the component, a bar code reader attached to the portable unit 14 can be used to decode the bar code information and transmit the decoded information (or the bar code itself) to the monitoring and diagnostic service center 20 over the communication links previously described. The portable unit 14 and its visual interface replace the prior art paper-based information, thereby simplifying and expediting the repair process. Upon completion of the repair, the portable unit 14 generates a feedback report describing the nature of the problem and the repair actions taken. This report is sent to the monitoring and diagnostic service center 20, where it will be included with the repair history for that locomotive.

It will be appreciated that the present invention provides the technician with essentially all the information he needs to effectively conduct the diagnosis and repair procedures, relying on information that is transmitted from sources distant from the repair site. Having all this information available, including help from repair experts, avoids the use of paper copies, and ensures a quick and accurate diagnosis and repair of the locomotive 12. Further, via the portable unit 14, the technician can request individualized expert assistance from the diagnostic service center 20 when problems or issues arise that he is incapable of handling.

The monitoring and diagnostic service center 20 is operated by personnel who are experts in trouble shooting railroad locomotives. Information received about the locomotive 12 from the portable unit 14 can be electronically processed and then visually displayed to these repair experts. The repair expert analyzes the information and produces a recommendation identifying the potential root cause or root causes of the problem. The repair information is then delivered to the portable unit 14 for execution of the recommended actions in a timely fashion, providing an enhanced degree of accuracy in carrying out the repair procedure.

There are at least three different classes of maintenance procedures that may be performed on the locomotive 12. The first are predictive in nature. That is, based on information downloaded from the locomotive 12, experts at the monitoring and diagnostic service center 20 determine that a given component of the locomotive may be on a path toward eventual failure. It is important for the technician to replace this component to avoid a locomotive failure while it is in operation. The second class of maintenance procedures are those that are planned in advance to occur on a predetermined schedule. These are otherwise known as planned maintenance. Planned maintenance can be based on, for example, the number of locomotive service hours or the number of miles it has traveled since the last maintenance action. Again, the objective is to avoid failure during locomotive operation. In-service failures are especially costly and inefficient for railroad operations, because the locomotive and the train consist may have to be moved back to a service facility to undertake the required repairs. Clearly, this is an expensive and disruptive effort for railroad operations. Finally, the last repair class is those maintenance problems requiring immediate attention due to a component failure that disables or causes derating of the locomotive. With regular and timely predictive and preventive maintenance, the number of maintenance actions in the third category can be minimized.

Although not illustrated in FIG. 1, it is well known in the art that the locomotive 12 may have an on-board monitoring system for monitoring and recording data related to various operational aspects. The on-board monitoring system identifies faulty components and provides fault codes for use by the repair technician in diagnosing the problem. Also, the on-board monitoring system records the number of miles traveled, the amount of fuel consumed, the number of service hours, etc. In some locomotives, there may be more than one on-board monitoring system, each associated with different locomotive subsystems. In any case, the technician, using his portable unit 14, can access data stored in the on-board monitoring system and transmit it to any of the recipient sites shown in FIG. 1. This operational information may be desirable in the diagnostic and repair process. In some cases, depending upon the nature of the fault or anomalous condition, the on-board monitor automatically transmits this information back to the MDSC 20, where a repair recommendation is formulated and then made available to the portable unit 14, in a manner to be discussed further below. For those locomotives that do not have an onboard monitor, the technician may have to directly extract information from the locomotive 12 and forward this information to the MDSC 20. To extract this information and provide it to the MDSC 20, the technician may use the video camera or bar code reader in conjunction with the portable unit 14, as discussed above.

Figure 2:
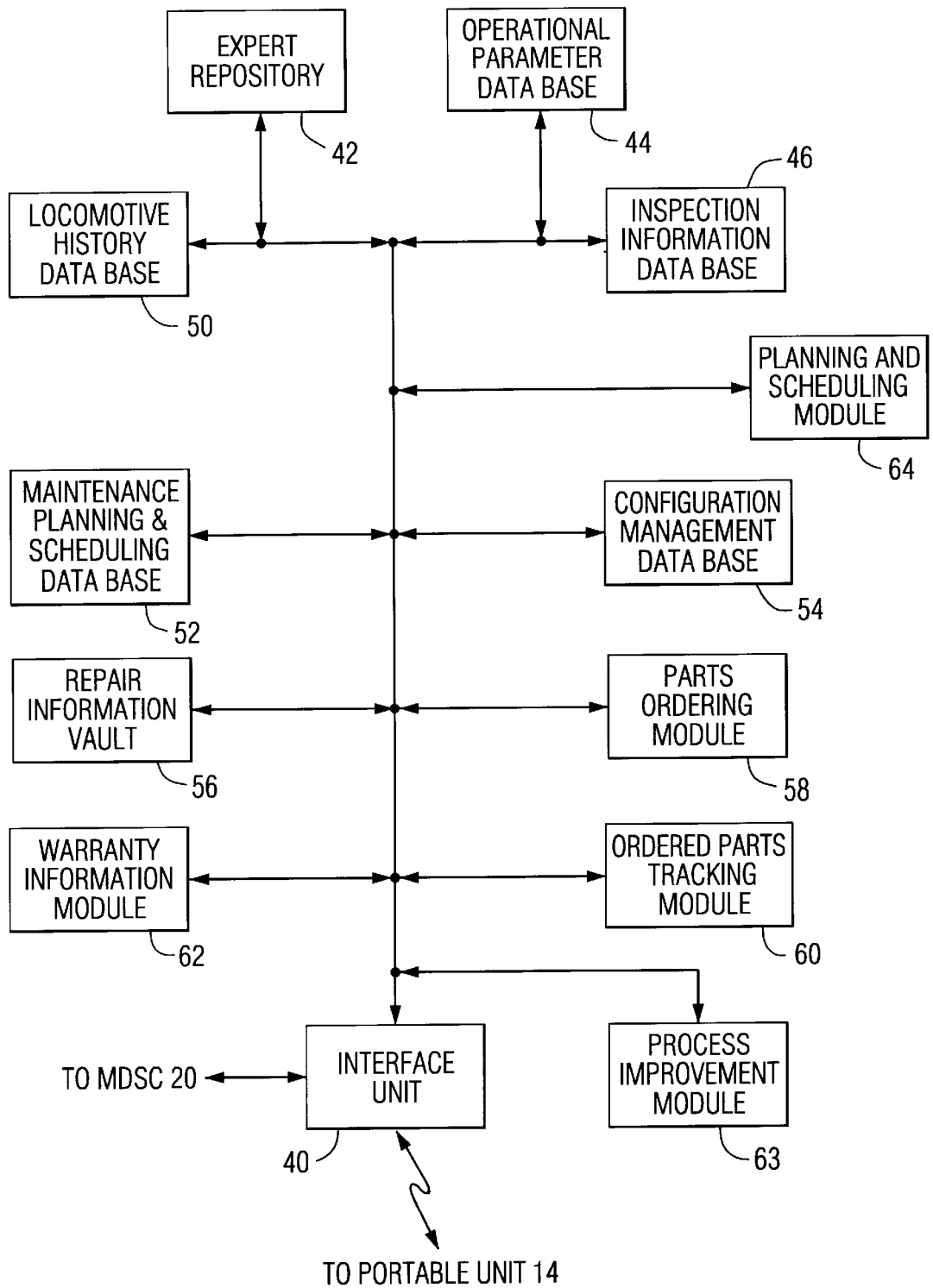
FIG. 2 is a block diagram showing exemplary subsystems for the system of FIG. 1.

FIG. 2 is a block diagram illustrating various exemplary databases and modules to which users, e.g., a technician or any other personnel associated with services operations, may have access (directly or indirectly) through the portable unit 14. The databases and modules are also linked bi-directionally so that the technician can move seamlessly from one to the other either manually or automatically through a hyperlink process whenever the required information is stored in more than one location.

The present invention in one aspect thereof contemplates an electronic service delivery system (that is, E-izing) that allows many software applications and databases such as those illustrated in FIG. 2, to be available and utilized at the site where a technician is to perform diagnosis, maintenance, or repair services on any mobile asset, such as the locomotive 12. The present invention provides streamlining and standardizing of service information and multiple processes as well as providing the technician with all the required information needed to repair the locomotive 12 on location.

An interface unit 40 is shown generally for conditioning data transferred between the various information sources of FIG. 2 and the portable unit 14. The interface unit 40 provides data conditioning, modulation or demodulation of a carrier signal to transmit or recover an information signal and signal conditioning for baseband transmission, as dependent on the nature of the communications channel. The interface unit 40 supports both wired and wireless transmissions and their related protocols. Both the portable unit 14 and the MDSC 20 communicate bi-directionally with the various databases and modules of FIG. 2 for the purpose of entering data into or extracting data from the databases and modules.

An expert repository 42 stores the repair recommendations authored at the MDSC 20. These recommendations include: suggested repairs based on operational and/or failure information extracted from the on-board monitoring system of the locomotive derived from symptoms reported by the repair technician, or planned maintenance actions, or field modifications or upgrades. The recommendation can include suggested trouble shooting actions to further refine the repair recommendation and links to appropriate repair instructions, schematics, wiring diagrams, parts catalogs, and trouble shooting guides to make the diagnosis and repair process easier. Diagnosis information can be returned to the MDSC 20 in real time via the portable unit 14 for further analysis in the development and refinement of a repair recommendation. At the MDSC 20, expert systems, artificial intelligence tools, and case-based reasoning tools are used to develop the specific repair recommendations stored in the expert repository 42. These tools are discussed in greater detail in the commonly owned patent application entitled "Apparatus and Method for Performance and Fault Data Analysis" bearing patent application Ser. No. 09/629,597, filed on Jul. 31, 2000. For locomotives having an onboard monitor that generates a specific code for a specific operational fault, that code can be used to retrieve relevant diagnosis and repair information from the expert repository 42. The expert repository 42 can also include special procedures providing the technician with up-to-date procedures for performing certain tasks on the locomotive 12.

An operational parameter database 44 is the storage site for the operational data and information items that are transmitted between the monitoring and diagnostic service center 20 and the locomotive 12. The transmitted information, which is continually updated as new information is received, includes: fault codes, repair action feedback, repair action analysis, inspection results, operational information, and repair schedules. After recommendations are prepared at the MDSC 20, they are stored in the operational parameter database 44, while awaiting transmission to the portable unit 14 for implementation. Operation parametric trending information is also stored within the operational database 44. The trends can calculated by comparing operational values over a period of time and comparing those values with historical data or nominal data for similar or identical locomotives.

An inspection information database 46 stores information indicating planned inspection dates for the locomotive 12. The inspection schedule is unique to each individual locomotive, based on the locomotive identification or road number. When a locomotive is due for inspection, the appropriate inspection procedures, stored in the inspection information database 46, are transmitted to the portable unit 14. In one embodiment, the repair procedure includes feedback boxes for each inspection step. These feedback boxes are completed by the technician and automatically generate a summary inspection report that is saved in the repair information database 46 or printed for filing. Procedures for performing rail car and daily locomotive inspections are also stored in the inspection information database 46.

The inspection information database 46 further includes a wizards module to aid the inspection process. The wizards, which include standard inspection processes to identify locomotive problems, present the inspection process in a step-by-step procedure that eliminates guesswork on the part of the technician. Further, the technician is able to choose the order in which the inspection is conducted only if the individual inspection tasks are not interdependent. The wizards module further provides access to technical information in the expert repository 42 as necessary. In addition to the inspection wizards, maintenance wizards walk the technician through maintenance processes that need to be carefully controlled to ensure a quality result. The steps of the maintenance wizards are integrated with a repair or maintenance work order and may further utilize back-end information (i.e., e-training, technical manuals and schematics). The maintenance wizards also provides access to trouble shooting wizards as appropriate. The trouble shooting wizards isolate a problem to a specific part and then create a work order for the repair of that part.

Using the portable unit 14, the technician can enter a locomotive identification number or road number to retrieve a history of past repairs from a locomotive history database 50. A feedback feature associated with each repair task prompts the technician to enter certain information as repair steps are completed. This information is captured at the MDSC 20 and stored in the locomotive history database 50 to create a parts usage history and a record of the repair tasks completed. For example, a serial number and a description of each part used during a repair is retained within the locomotive history database 50. Each repair task has an appropriate closing code. The technician closes the repair using the appropriate code, after which the locomotive can be returned to service. The locomotive history database 50 includes three classes of repair: repairs not started, repairs in progress, and closed repairs.

Additional information available to the technician resides in a maintenance planning and scheduling database 52. Using this database, the technician can access railroad shop management tools and generate and modify locomotive maintenance and repair work orders and schedules. The technician can also access standard work orders and procedures and adapt them as necessary to a specific locomotive. Information concerning repairs in progress is also available in the maintenance planning and scheduling database 52, on a real time basis. Information about a specific locomotive's "health" is available from the maintenance planning and scheduling database 52 by checking the pending and forecast inspections and repairs. Pending repair or maintenance work orders stored in the maintenance planning and scheduling database 52 include an estimated repair time and the site where the repair is to be performed. Further, each standard repair process is assigned a repair code and each repair code has an associated repair time estimate. Collectively, this repair time information aids the railroad management with scheduling locomotives for return-to-service. The maintenance planning and scheduling database 52 further includes a safety-on-the job module providing easy and fast access to online safety rules and procedures.

The locomotive repair technicians have quick and easy access to accurate locomotive hardware and software version configurations via a configuration management information database 54. The hardware and software elements incorporated into a locomotive can be different, even within the same locomotive model. Thus, each locomotive is uniquely identified with a road number and the configuration management information database 54 allows retrieval of configuration information based on the unique locomotive road number. The technician needs accurate knowledge of the locomotive configuration before undertaking a diagnosis or repair. Heretofore, configuration information has been generally available only in paper form, and given the complexity of a railroad locomotive, the amount of paper describing the locomotive and its particular hardware and software configuration can be substantial, and difficult to manage and utilize. Also, the configuration management information database 54 advises the technician when software or hardware changes are required to upgrade the locomotive to the most recent configuration. The configuration management database 54 also includes all field modifications which alert the technician to suggested or mandatory modifications, including instructions for performing them for each locomotive, as issued by the locomotive manufacturer.

The configuration management database 54 also validates software application prior to loading into a specific locomotive 12. That is, if the software version is not compatible with other hardware or software components of the locomotive 12, approval for integration will not be granted. The configuration management database 54 can further identify the locomotive for which new software versions apply and can generate a work order for implementing that software version into the locomotive 12. As a result, software version incompatibility problems are avoided.

A repair information vault 56 includes a homepage address (e.g. a universal resource locator) for each repair code, with a link to repair instructions, schematics, parts catalogues, back shop manuals, operating manuals, drawings, trouble shooting guides, fault analysis manuals, maintenance manuals, video clips, still photographs, audio instructions, etc. All information in the repair information vault 56 is key word searchable by the technician (to avoid page-by-page searching), and all the data is linked (much like World Wide Web hyperlinks) for ease in navigating and locating the appropriate information. For example, acronyms and part numbers are linked to the applicable catalog in the parts-ordering module 58 discussed below. Retrieval of the technical documentation in the repair information vault 56 can be further limited to portions of a larger document to avoid overwhelming the technician with too much information. The repair information vault 56, in one embodiment, includes a road number navigator to provide a searchable field for retrieving relevant information stored within the information vault 56 by entry of the locomotive road number. The repair information vault 56 further includes a series of online skill-based tutorials ranging from the simplest to the most complicated diagnosis and repair tasks. For instance, the entry level tutorial may provide overall familiarization with the locomotive operating systems and the most advanced level teaches detailed analysis and diagnostic concepts.

The technical documentation included within the repair information vault 56 provides quick and easy access via visual-drill-down techniques to specific sections of the documentation, as required for a given repair. The searchable features offer easy access to specific technical information (e.g., torque values) to improve the accuracy and efficiency of repairs. Specific repair procedures can also be reviewed to improve the safety of the repair process.

The parts-ordering module 58 is also available to the technician via the portable unit 14. There are two types of parts orders: general inventory orders and repair orders. An online ordering system, included in the parts ordering module 58, allows direct parts ordering for inventory or for a specific repair, and access to the railroad's parts inventory to determine if the part is already available there. Repair parts ordered for a specific repair are matched with the locomotive configuration to ensure the correct part is obtained. The parts ordering module 58 also provides access to online catalogs issued by suppliers of locomotive components. General inventory orders are executed whenever the railroad's inventory for a part falls below a predetermined threshold. The parts ordering module 58 further includes easy-to-use visual navigation allowing the technician to drill down to pictures of a locomotive to pick a specific part without knowledge of the part number. Further, the availability of the required part is indicated and if available, the part can marked for delivery to the service yard 13.

The parts-ordering module 58 provides electronic inventory consumption recording so that inventory can be shipped from the supplier to the railroad operator or party responsible for the repair. The parts-ordering module 58 is integrated with the maintenance planning and scheduling database 52 to insure that parts required for scheduled maintenance activities are available in inventory just prior to the scheduled maintenance. This technique improves the forecasting of inventory purchases and assures that the parts inventory is maintained at an optimum level. Information regarding the number of parts in inventory and the location of such parts (for example, in the geographically distributed inventory shops maintained by the railroad or party providing repair services) is also available in the parts-ordering module 58.

Once parts are ordered, the ordered parts tracking module 60 allows tracking of all active and historical parts orders for a locomotive, e.g., whether shipped on back order and the quantity ordered. The tracking function can be driven by the locomotive identification number, by the order number or the part number.

A warranty information module 62 allows access to the applicable locomotive warranty documents. By entering a locomotive identification number, personnel can view all warranty information about that locomotive and its components. Warranty claims can also be submitted and tracked via the warranty information module 62.

A process improvement module 63 provides information and tools (such as data warehouse reports) to analyze the effectiveness of the repair process and the overall operations at the service shop 16. The process improvement module 63 also tracks cycle time for individual maintenance steps and for the execution of specific repairs.

A shop planning and scheduling module 64 provides current information and processes to plan the maintenance of a plurality of locomotives 12 at the service shop 16 or a service yard 13. The planning and scheduling module 64 also includes a monitor board or display for identifying the status of the implementation of the service recommendations on each locomotive in the service shop 16 or at the service yard 13.

All the databases and modules discussed above are available seven days a week and 24 hours a day from the portable unit 14. There is little or no human intervention required to access them, and thus around the clock availability is ensured.

In those embodiments and/or situations where it is necessary for the technician to extract information from the locomotive 12, the technician connects the portable unit 14 to a locomotive interface (e.g., an Ethernet connection) to communicate with the locomotive on-board monitoring system. The portable unit user interface guides the collection of information from the locomotive 12 and also provides memory for temporary data storage. Later, the data can be transferred to the railroad service shop 16 and/or to the monitoring and diagnostic service center 20. In one embodiment, the portable unit 14 includes a bar code scanner for reading the locomotive identification number, part numbers, and serial numbers. Use of a scanner for parts identification ensures accurate information feedback to both the parts ordering module 58 and the ordered parts tracking module 60. In another embodiment the portable unit 14 includes a camera for providing visual information back to the monitoring and diagnostic service center 20.

Figure 3:
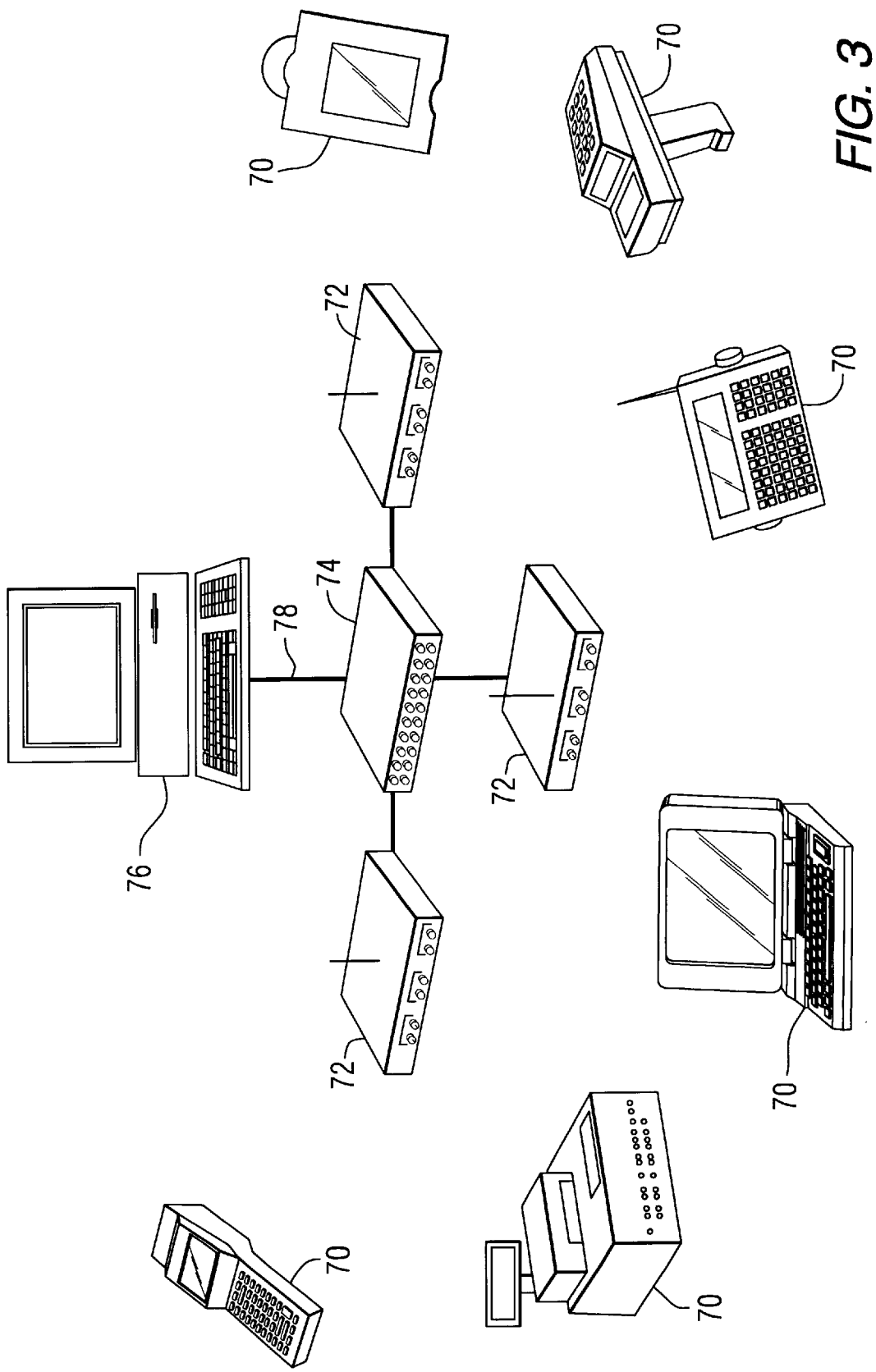
FIG. 3 is a pictorial rendering showing exemplary elements of a wireless embodiment in accordance with one aspect of the present invention.

In one embodiment, the portable unit 14 functions as a stand alone device, performing the transactions discussed above without physical connection to a data portal. As shown in FIG. 3, the portable unit can comprise various styles and configurations, designated by reference character 70. The portable units 70 communicate via an RF wireless link, with one or more access points 72. The access points 72 is connected to an Ethernet hub 74, which then provides connectivity to a host server 76, via an Ethernet based media 78, employing, for example, the TCP/IP protocol. The access points 72 serve as both receivers and transmitters (i.e., transceivers) to both receive information from and transmit information to the portable units 70, including the information discussed above in conjunction with FIG. 2. In one embodiment, one access point 72 can support up to 400 portable units. Various data security measures, including encryption can be employed on the communication link. Use of a wireless link also allows easy expansion, as the wireless scheme can accommodate both small and large wireless networks, and does not require running new wires as the network expands. In another embodiment of the present invention, the portable unit 14 can be connected to a data communications line via a wire based medium, such as the land-based telephone system, a cellular system or a satellite based communication system. Although shown as a relatively simple device including a display, the portable unit 14 in other embodiments, may include a full size monitor, a key board, mouse, printer and/or other related input/output devices for enabling and expanding the interaction between the technician and the portable unit 14. Information is conveniently displayed on the portable unit 14 at the click of a mouse, the touch of a screen, a voice command, etc. dependent upon the specific operational features of the various portable units 70 illustrated in FIG. 3. In one embodiment, the portable unit 14 comprises a handheld ViA computer, loaded with the appropriate software applications, available from ViA, Inc., of Burnsville, Minn.

The portable unit 14 also offers an instant messaging feature allowing the technician to quickly communicate repair information (for example, fault codes, diagnostic readings, or simple descriptive text) to a repair expert at the monitoring and diagnostic service center 20. The repair expert can respond directly to the technician through the portable unit 14. This feature is intended for use during the collection of additional diagnostic information or when problems are encountered during the course of a repair.

Figure 4:
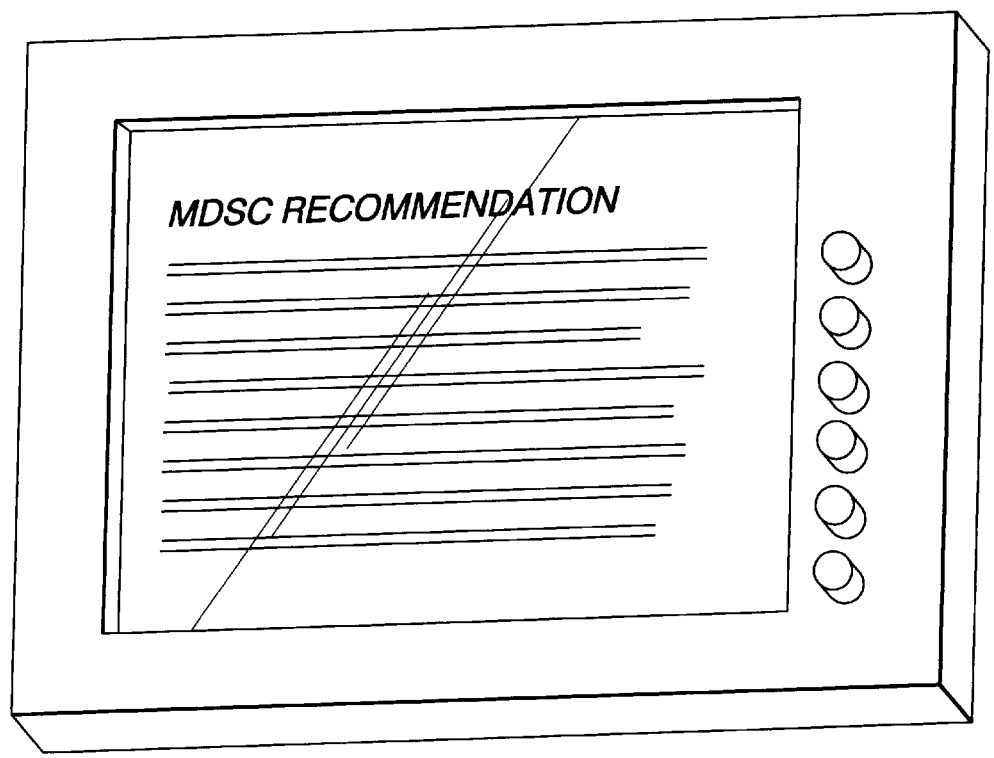
FIG. 4 is an exemplary screen display of a portable unit such as may used to implement aspects of the present invention.

The portable unit 14 includes a graphical user interface. An exemplary screen is shown in FIG. 4. The information is presented in a clear and concise style so that users with all ranges of experience can adequately use and understand the displayed information. The portable unit 14 offers short cut links to commonly used data and functions for experienced users, with more detailed instructional links for less experienced users. The portable unit 14 also has a back-out feature to move from the current screen to the previous screen, in this way leaving the user with no dead ends. Regardless of the locomotive that is undergoing repair, all applications and information on the portable unit 14 and all file formats, (no matter there origin from one of the many databases illustrated in FIG. 2) utilize the same presentation format and in this way their source will be transparent to the technician.

Figure 5:
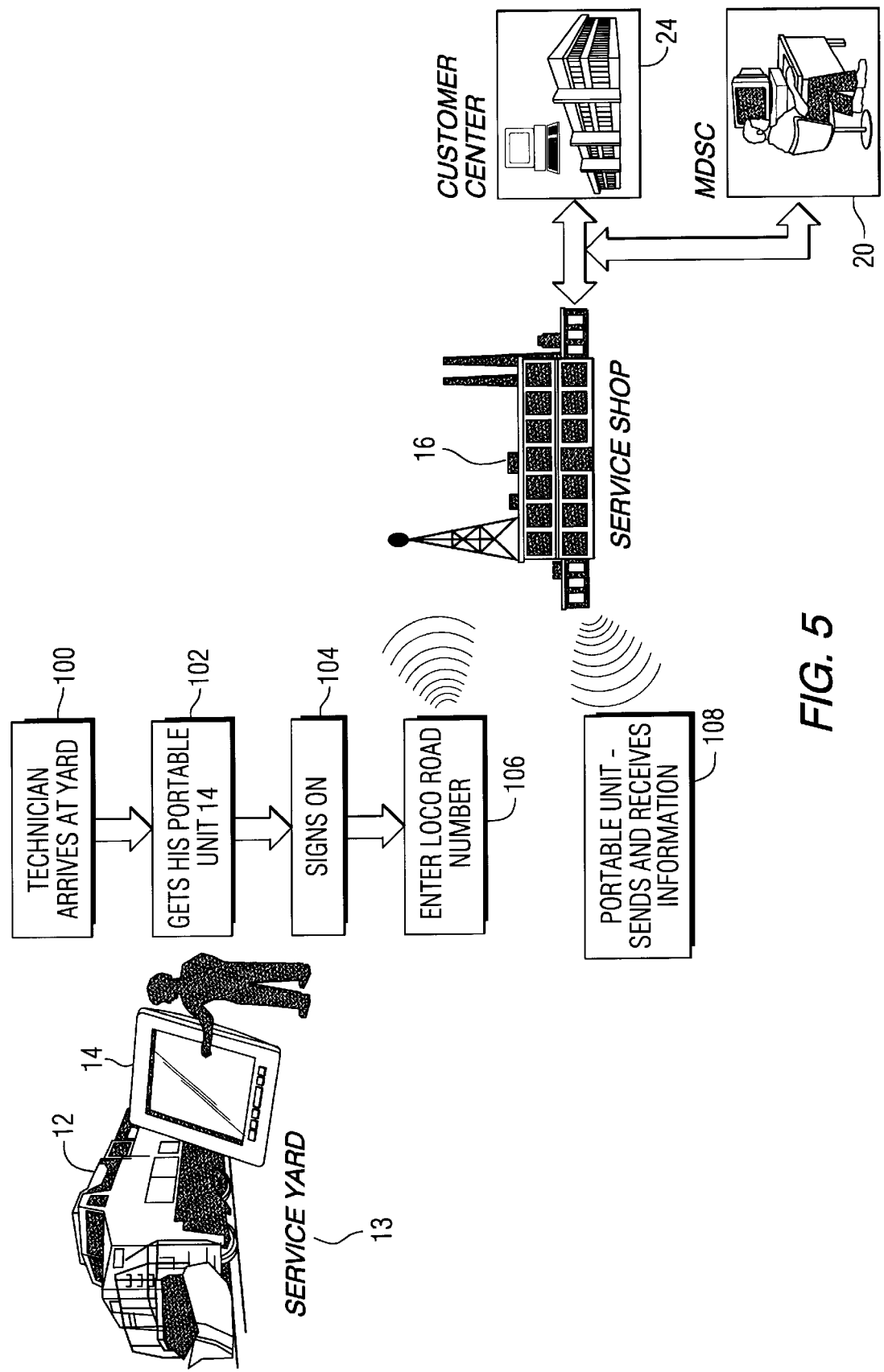
FIGS. 5 and 6 are respective flow charts illustrating an exemplary repair process for a given equipment.
Figure 6:
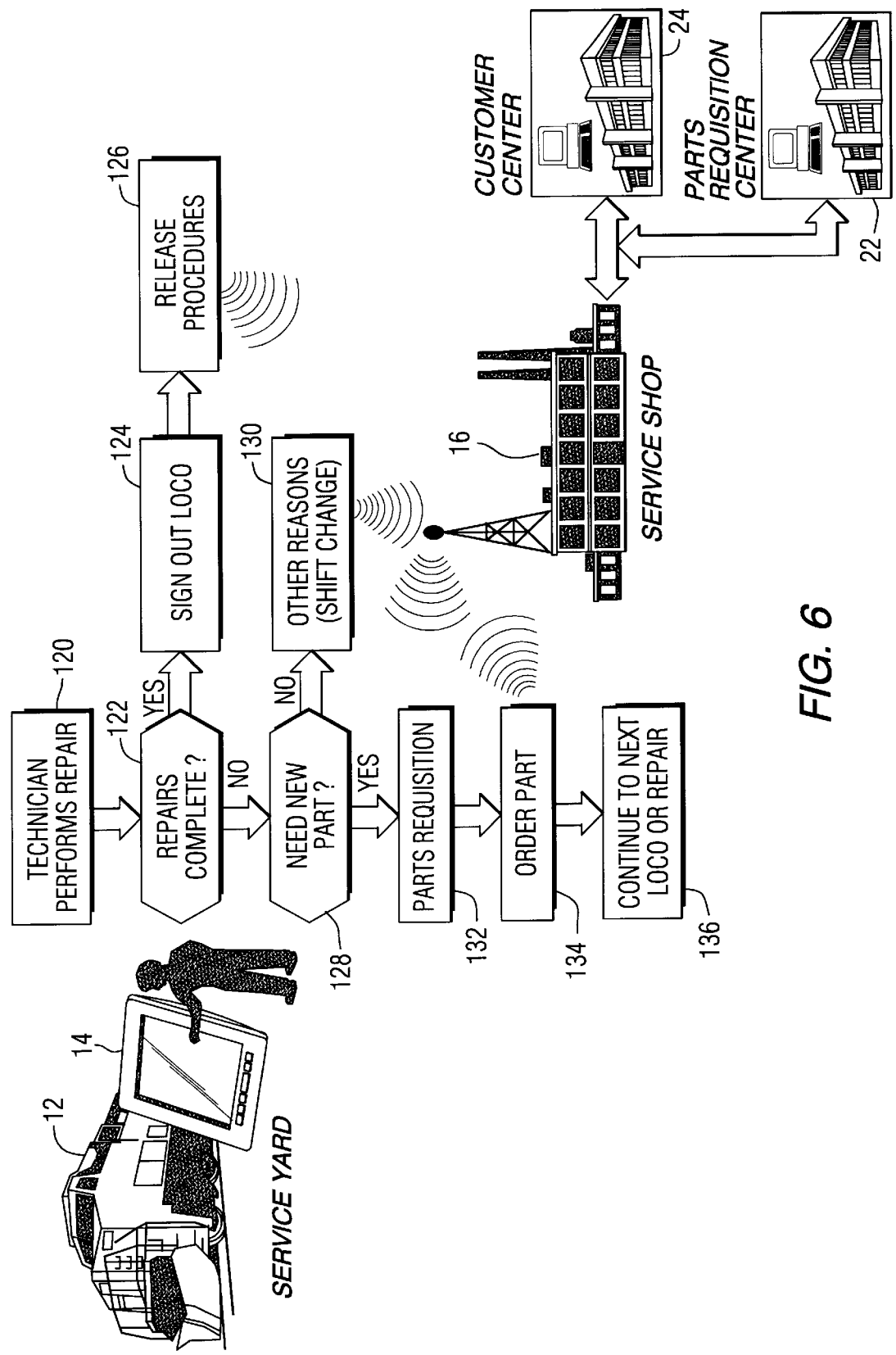

FIGS. 5 and 6 are flow charts showing exemplary steps that may be involved in implementing a service recommendation according to one aspect of the present invention. Typically, the service recommendation is a recommendation for a repair, but the teachings of the present invention are not so limited. Service recommendations can also involve maintenance procedures or diagnostic processes with the objective of finding the root cause for a fault or anomalous condition. At a step 100, a technician arrives at the service yard 13 where the locomotive is parked. The technician retrieves his portable unit 14 (step 102) and signs on at a step 104. At a step 106, the technician enters the locomotive road number or other locomotive identification number, which is transmitted to the service shop 16. FIG. 5 illustrates this transmission through a wireless arrangement, although as will be appreciated by those skilled in the art, there could also be a wire-based connection between the portable unit 14 and the service shop 16. The service shop 16 may then establish a communications connection with the customer center 24 and/or the MDSC 20. The portable unit 14 queries the MDSC 20 for information for the locomotive road number entered at the step 106. The technician may request any of the items discussed in conjunction with FIG. 2, such as repair or maintenance information, historical repairs, etc. Once the requested information is received at the service shop 16, it is sent to the portable unit 14, as illustrated at a step 108.

Information sent from the portable unit 14 to the MDSC 20 includes problems with a locomotive, the current status of locomotive systems, repair requests, diagnostic information and video clips and still photographs. Locomotive problems may be observed directly by the technician or downloaded from the locomotive onboard monitoring system as previously discussed. Information returned to the portable unit 14 from the customer center 24 and the MDSC 20 includes recommended repairs and relevant technical documentation required to perform the repairs as discussed in conjunction with FIG. 2. This information is displayed on the portable unit 14 to allow the technician to accurately and quickly repair the locomotive. The information displayed on the portable unit 14 includes a pictorial view of the locomotive and its constituent parts, repair steps, technical documentation relevant to the repair, and the tools necessary to perform the repair. Assembly diagrams and assembly instructions are also displayed. Multimedia information, such as video clips or audio instructions can also be transmitted to the portable unit 14 from the MDSC 20. In short, all information discussed in conjunction with FIG. 2 is immediately available to assist the technician with diagnosis, repairing and/or servicing of the locomotive.

Continuing to FIG. 6, a step 120 represents the technician's execution of the repair or service task. A decision step 122 asks whether the repair has been completed. When completed, processing continues to a step 124 where the locomotive is signed out from the repair site, either the service yard 13 or the service shop 16. At a step 126, release procedures are executed, after which the locomotive is returned to service. The release procedures involve confirming that all necessary steps required for return to service have been completed and generating a notice to railroad operational personnel that the locomotive 12 is ready to return to service.

If the repair has not been completed at the decision step 122, processing continues to a decision step 128, where inquiry is made as to whether a new part is needed to complete the repair. If a new part is not required, processing continues to a step 130 to determine why the repair has not been completed. For example, there may have been a work-force shift change during the repair process. In any case, the reasons why the repair has not been completed are communicated to the service shop 16 by the technician via the portable Unit 14.

If a new part is needed, processing moves from the decision step 128 to a parts requisition step 132, where, the portable unit 14 communicates with the service shop 16 to requisition the part. A step 134 is executed for those parts that must be ordered from a third party supplier, via the parts requisition center 22. As illustrated by step 136, once the part has been ordered, the technician can continue the diagnostic and repair process for another locomotive or perform another repair on the current locomotive.

The electronic data delivery system of the present invention provides in one aspect thereof an improvement in the diagnosis, repair and maintenance of a mobile asset such as the locomotive 12 by applying E-business technologies to replace the prior manual paper-based processes. A benefit derived from applying these technologies includes improved availability of the mobile asset by reducing the cycle time of the repairs and more efficient and focused repair processes. Additionally, by using the various databases and modules illustrated in FIG. 2, the many processes related to a repair operation will be measurably improved in accordance with the teaching of the present invention.

Figure 7:
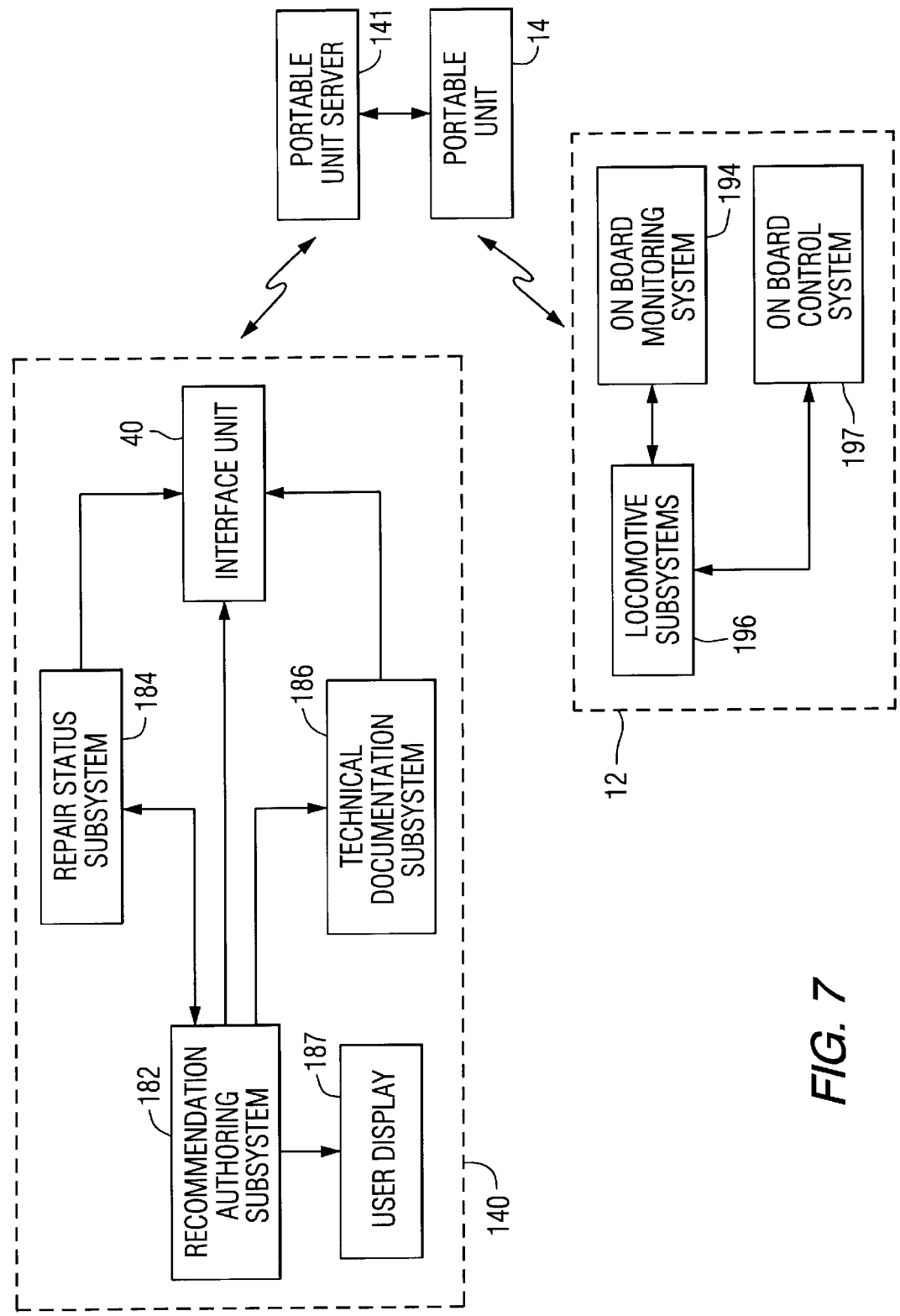
FIG. 7 is a block diagram of exemplary components of a system constructed according to aspects of the invention.

The diagnosis and repair system 140, the portable unit server 141, and the portable unit 14, constructed according to aspects of the present invention are illustrated in FIG. 7. While FIG. 2 diagrammatically illustrates the individual databases and information sources accessible to the portable unit 14, FIG. 7 depicts aspects of the present invention from the system/subsystem level. The diagnosis and repair system 140 includes a recommendation authoring system 182, a repair status system 184, a technical documentation system 186, and the interface unit 40, previously discussed in conjunction with FIG. 2. With reference to the individual databases and information sources shown in FIG. 2, the recommendation authoring subsystem 182 includes the expert repository 42 and the operational parameter database 44. The repair status subsystem 184 includes the locomotive history database 50, the maintenance planning and scheduling database 52, the repair information vault 56, and the inspection information database 46. As suggested above, the diagnosis and repair system 140 may communicate with the portable unit 14 via the portable unit server 141. The communication link between the portable unit server 141 and the interface unit 140 can be either wired or wireless. Likewise, the portable unit 14 communicates (using either a wired or wireless media) with various components aboard the locomotive 12. In particular, the portable unit 14 extracts data from and provides data to an on-board monitoring system 194. Also, the portable unit 14 can query other locomotive subsystems, shown generally by a reference character 196.

The recommendation authoring subsystem 182 provides the functionality for authoring general repair recommendations and instantiating specific recommendations for a locomotive. The recommendation authoring system 182 provides the following exemplary functions: defining the steps involved in a repair, specifying the relevant technical documentation to accompany the repair recommendation and specifying the data that needs to be collected by the technician to execute the repair. The repair recommendation, instructions, and data to be collected are compiled into a cohesive deliverable package that is eventually delivered to the portable unit 14. In one embodiment, the compiled information is provided as a web formatted package. By using a web format (or other standardized format) the information can be displayed on the portable unit 14 in a standard format with which the technician will eventually become familiar. Consistency and familiarity with the repair information format allows the technician to efficiently navigate through the information provided and in this way increase his productivity. One feature of the recommendation authoring subsystem 182 is the creation of repair-specific process steps (including all relevant technical documentation necessary to execute each step) for the technician. Using all the general diagnosis, repair and technical information available, the recommendation authoring subsystem 182 selects only that information needed for a specific repair as associated with a specific locomotive based on a unique locomotive designator, such as the road number, and presents this to the technician. With repair-specific information and back-up technical documentation readily available, the technician can more easily and efficiently execute the repair process.

The repair status subsystem 184 maintains and provides information on the status of a repair. This information is based on feedback provided by the technician during and after completion of the repair. The technical documentation subsystem 186 maintains the technical documentation for the locomotives and supports the selection and retrieval of the appropriate technical documentation into a repair-specific set of relevant technical documentation.

The portable unit server 141 disseminates repair instructions to the portable units 14 and collects information from those units. Although only one portable unit 14 is shown in FIG. 7, it will be understood that the portable unit server 141 can communicate with many portable units 14, as shown in FIG. 3. It is expected that each technician or team of technicians with service or repair responsibility will have a portable unit 14. The functionality provided by the portable unit server 141 includes: serving as a communications link to the interface unit 40, connecting with and identifying each portable unit 14 at power up, transferring feedback files from the portable unit 14 to the diagnosis and repair system 140, transferring the repair recommendations and relevant technical documentation to the portable unit 14, synchronizing clock times, validating the identity of the technician using the portable unit 14 and clearing files from the portable unit 14 once these files have been transferred to the portable unit server 141. In one embodiment of the present invention, the portable unit 14 can communicate directly with the diagnosis and repair system 140, thus rendering the portable unit server 141 unnecessary. In such an embodiment, the tasks performed by the portable unit server 141 are performed by the diagnosis and repair system 140 and/or by the portable unit 14.

The portable unit 14 displays the repair instructions to the repair technician and creates a record of the service event. Among the functions of the portable unit 14 are: providing a log in and log out interface, displaying repair instructions and all supporting technical documentation (including multimedia information), accepting repair feedback information and updating the repair feedback file when a repair action is finished and communicating with the locomotive 12 to extract information from the on-board monitoring system 194 and the other locomotive subsystems 196.

In one exemplary embodiment, a principal function of the recommendation authoring subsystem 182 is to select general repair recommendations from the various sources available within the diagnosis and repair system 140 and to transform this information into a set of locomotive-specific, repair-specific instructions and relevant documentation. The recommendation and authoring subsystem 182, in one embodiment, is located at the monitoring and diagnostic service center 20. A general repair recommendation is those repair actions (i.e., a sequence of steps to be performed by the technician to execute the repair) that are responsive to a given set of fault codes. These fault codes are downloaded by the portable unit 14 from the onboard monitoring system 194 and the other locomotive subsystems 196, and provided to the recommendation authoring subsystem 182. The fault codes may also be communicated directly and automatically to the MDSC 20 from the on-board monitor, as discussed in detail in the aforementioned patent application entitled "On-Board Monitor for a Railroad Locomotive". In the present invention, the general repair recommendations are instantiated into a specific repair recommendation for a given fault that has occurred on a specific (i.e., road number) locomotive 12. A user display 187 is responsive to the recommendation authoring subsystem 182 for use by the repair expert 142 in formulating the repair recommendation.

The technical documentation available to the recommendation and authoring subsystem 182 includes parts catalogs, maintenance manuals, schematic diagrams, fault code listings, and back shop manuals, and various multimedia files, such as video or audio instructional materials. This information represents typically-recommended documents needed for a repair. Specific pages and excerpts from this generalized documentation are identified by the recommendation authoring subsystem 182 when the recommendation is instantiated for a particular locomotive repair.

In one exemplary embodiment, the recommendation authoring system 182 interfaces with the technical documentation subsystem 186 to locate technical documentation and multimedia presentations relevant to the recommendation. The recommendation authoring system 182 provides search criteria to the technical documentation subsystem 186 for retrieving relevant documentation. Included within the search criteria are one or more of the following: part name, part number, action name, repair fault code, and locomotive model. Search scope information is also provided to the technical documentation subsystem 186 for specifying where to look for relevant documentation. Included within the search scope are parts catalogs, maintenance manuals, schematics, back shop manuals, fault analysis pages, field modification instructions, and multimedia files. In response to the inputs, the technical documentation subsystem 186 responds to the recommendation authoring system 182 with the location of the technical documentation that satisfies the search criteria. The output is a list and each entry in the list contains the following information about that entry: location of the page (for subsequent retrieval), size of the file making up the page, the type of page (i.e., the document source), and the locomotive road number or numbers to which the page applies.

Another interface between the recommendation authoring subsystem 182 and the technical documentation subsystem 186 provides access to a browsing mechanism within the technical documentation subsystem 186. This browsing mechanism allows the repair expert to review the documentation pages to determine if it is necessary to refine the search criteria.

As illustrated in FIG. 7, the recommendation authoring subsystem 182 also interfaces with the repair status subsystem 184. The recommendation authoring subsystem 182 allows selection of existing general repair recommendations for a specific problem or repair code. Also, the recommendation authoring subsystem 182 inputs a summary of the repair recommendation to the repair status subsystem 184 so that the latter can create an entry in the repair status database for each repair. The repair status subsystem 184 responds to the recommendation authoring subsystem 182 when the repair entry is created. The transmitted summary includes: the repair case number, the date and time that the recommendation was issued, the road number to which it applies, the steps outlined in the repair recommendation, the technical documentation to accompany each repair step, and the repair status. The recommendation authoring subsystem 182 also provides to the repair status subsystem 184 the data store locations for the data entry objects. The purpose of this input is to ensure that the data store locations are recognizable by the repair status subsystem 184.

The repair status subsystem 184 also supplies a list of possible locations for storing the values collected by the data entry objects. The repair status subsystem 184 stores these values when they are received following an actual repair event, as part of the repair feedback process.

The technical documentation subsystem 186 maintains the technical documentation repository and supports the selection and retrieval of technical documentation into a repair specific set of relevant documents by the repair expert. In one embodiment, the technical documentation is available in a web-based format. The technical documentation subsystem 186 supports the retrieval of individual pages or sections from technical documents, rather than retrieval of the entire document. The technical documentation is also indexed. These indexes provide quick identification of document subsets. For example, the indices can support identification of all documentation pages related to a specific part number, a specific part name, or a repair process name. All relevant technical documents are stored in the technical documentation subsystem 186. The stored documents are: parts catalogs, wiring and parts schematics, maintenance manuals, fault analysis pages, back shop manuals, field modifications instructions, training instructions, part identification animations, assembly animations, etc. The documentation includes both text, graphics, and visualization based documents. Thumbnail style summaries may be included with each document.

The files of the technical documentation subsystem 186 can be remotely browsed. That is, a user logged in to a network computer connected to the diagnosis and repair system 140, but not necessarily the equipment hosting the technical documentation subsystem 186, can search for pages, view pages, follow links between pages, and copy pages to a local file.

The technical documentation subsystem 186 supports a search mechanism based on one or more of the following criteria: part name, part number, action name, fault code, locomotive model, and document type. Search results are presented in the form of a summation of the search results, with pointers to the actual pages so they can be retrieved on demand. The technical documentation subsystem 186 also supports the retrieval of individual document pages or document sections from its files. The retrieval process copies the retrieved pages to the user's application. The retrieval mechanism automatically adjusts hyperlinks between the copied pages accordingly.

The technical documentation subsystem 186 receives two types of inputs from the recommendation authoring system 182. These include search criteria and search scope. Search criteria refers to one or more of the following: part name, part number, action name, fault code, or locomotive model number. The search scope refers to parts catalogs, maintenance manuals, schematics, back shop manuals, fault analysis pages, and field modification instructions.

The output from the technical documentation subsystem 186 is the list of all the technical documentation pages satisfying the search criteria. Each entry contains the following: the location of the page (for subsequent retrieval), the size of the file that makes up the page, the type of page (that is, the document source), and the locomotive road numbers to which the page applies. The recommendation authoring subsystem 182 can also access the technical documentation subsystem 186 for generalized browsing of the files. This feature allows a user to browse the documentation pages to determine the appropriate search criteria to use.

In one exemplary embodiment, the portable unit server 141 may use the following data concepts: specific recommendation directories, user identity files, portable unit status databases and home page files.

The recommendation directory is the location of web-deliverable, linked packages of repair instructions and technical documentation (including multimedia files) provided by the diagnosis and repair system 140 for each repair recommendation. This information is transferred to the portable unit server 141 and filed there. Each recommendation directory has a standard file format and architecture that allows the portable unit server 141 to read summary information about the repair recommendation.

Each repair home page begins with a summary of the repair steps and their corresponding feedback or data entry objects. From these original repair actions, the technician can drill down to more detailed information about the repair steps via links. In one embodiment, there is always a one-click path back to the original repair action from the deeper links. Once the repair step has been completed and appropriate feedback information obtained and recorded, the next step in the repair process is displayed, with links again to supporting documentation.

The user identity file, used by the portable unit server 141 as a data concept, contains names of all technicians registered to use the portable units 14. When a technician logs on, the identity entered in the log in box is checked against the identities stored in the portable unit server 141. If the identification is not in the file, the technician is asked to re-enter the identification information. The portable unit server 141 also includes a portable unit status database containing information about the deployment of each portable unit 14.

In one exemplary embodiment, each repair recommendation may have a structure that includes the following data: the recommendation identification number, the recommendation status, the technician identification number, the portable unit identification number, the log in time when the repair began, and the log out time when the repair was finished. Each repair recommendation has a file containing this information.

The last data element used by the portable unit server 141 is the home page list of recommendations. The home page list is the initial file displayed on the portable unit 14 when a technician logs on. The home page file includes a list of the currently active recommendations with: the locomotive road number, the repair technician identification number, the repair status, and a short description of the repair. A technician selects a specific recommendation from the home page file for transfer to his portable unit 14, at which time the specific recommendation directory is transferred to the portable unit 14. Whenever any data related to an active repair recommendation is changed, the home page file is automatically modified to reflect the change.

The repair status subsystem 184 (see FIG. 7) maintains and provides information on the status of each repair. Instantiating a repair recommendation triggers the creation of an entry in the locomotive history database 50 of the repair status subsystem 184. The locomotive history database 50 is updated with data values collected by the data entry objects during a repair operation. Each repair entry in the locomotive history database 50 supports the following data items: repair case number, railroad case number, locomotive road number, the date the recommendation was issued, the rail yard where the repair was performed, and a list of the rail yard personnel who worked on the recommendation. Each repair entry also includes the data values collected with each step, the date the repair step was performed (as derived from the data collection process), and the current repair status (e.g., none, active, halted, or complete).

A new repair status entry is created in the repair records database 50 of the repair status subsystem 184 as follows. When a new recommendation is instantiated in the recommendation authoring subsystem, a summary is passed to the repair status subsystem 184. This action triggers the creation of an entry in the repair records database 50 for the recommended repair. If a recommendation for a given case number is instantiated multiple times, the repair status subsystem 184 maintains the latest version of the recommendation. The repair status subsystem 184 maintains the most recent feedback irrespective of the version of the recommendation.

As discussed above, there is a considerable amount of technical documentation available to the technician using the portable unit 14. The technician can navigate or search through the technical documentation by using wizard applications or visual drill downs. Additionally, the technical documentation includes on-line tutors that can be used to enhance the technician's understanding of the structure and function of the locomotive. The tutors are available in various levels of difficulty.

Figure 8:
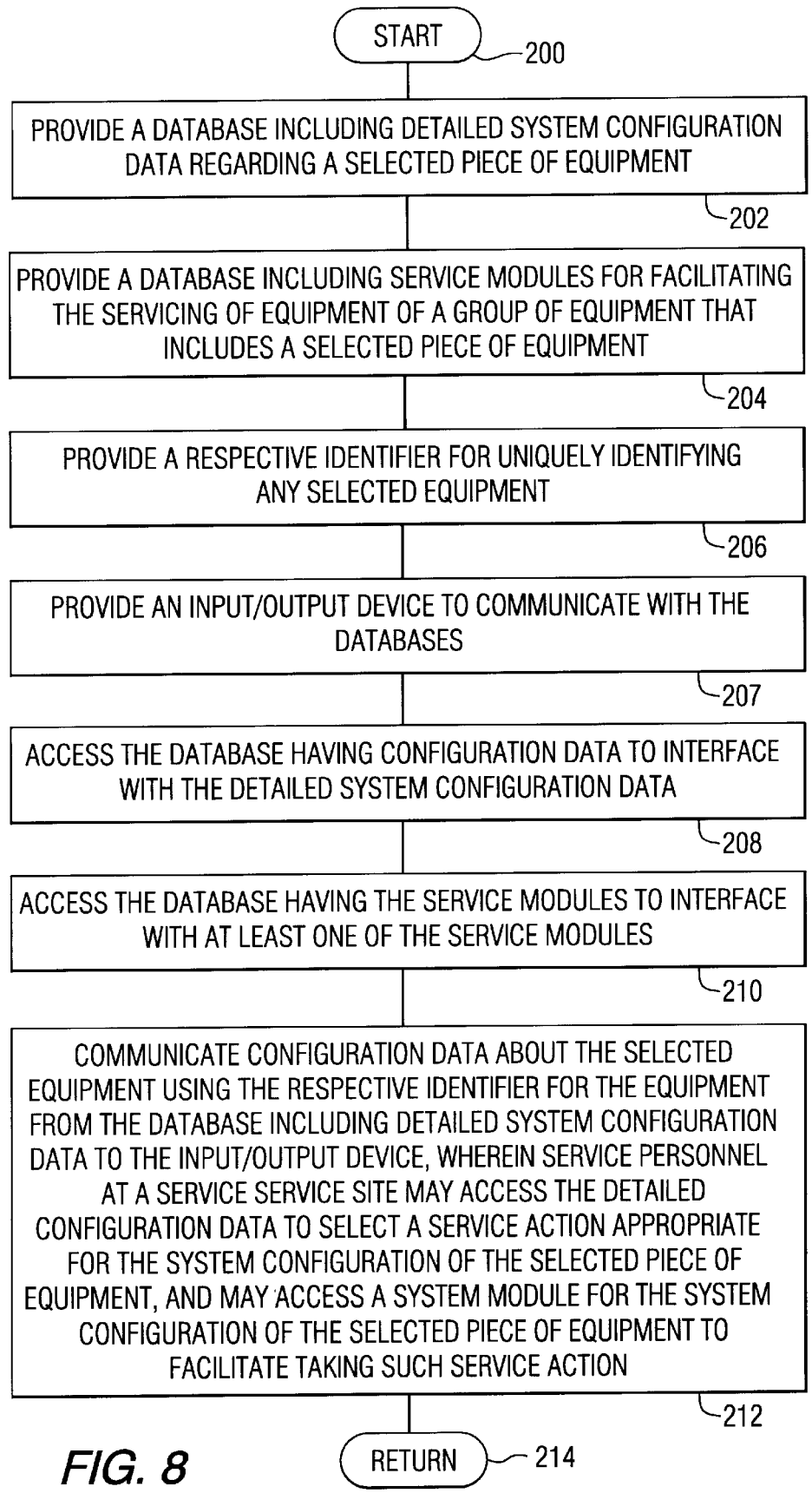
FIG. 8 is a flow chart of an exemplary method for servicing a selected piece of equipment made up of a plurality of systems and subject to unique system configurations and servicing requirements, in accordance with one embodiment of the present invention.
Figure 9:
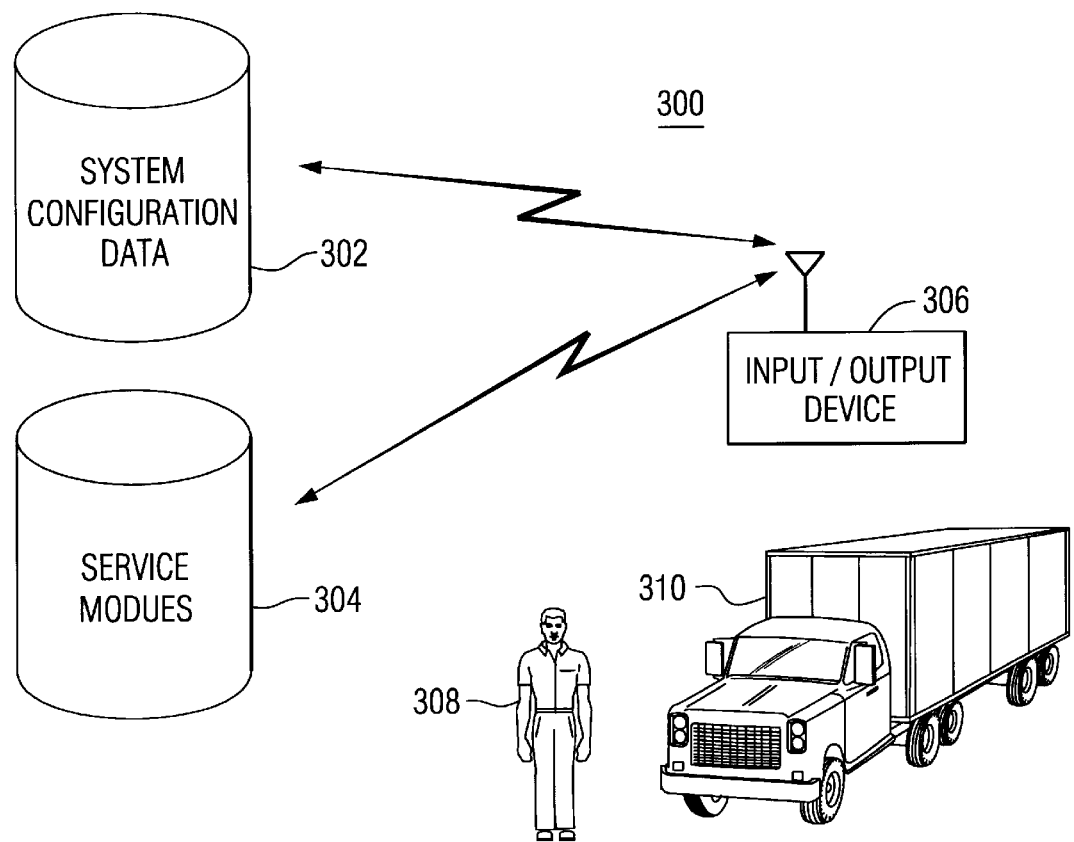
FIG. 9 is a block diagram of exemplary components of a system that may be used for performing the flow chart of FIG. 8.

FIGS. 8 and 9 will be described jointly below. FIG. 8 shows a flow chart of a computerized method for servicing a selected piece of equipment made up of a plurality of systems, e.g., operational systems, and subject to unique system configurations and servicing requirements. FIG. 9 illustrates a system 300 that may be used for practicing the flowchart of FIG. 8. Subsequent to start step 200, step 202 allows to provide a database 302 (FIG. 9) including detailed system configuration data regarding a selected piece of equipment 310 (FIG. 9). Step 204 allows to provide a database 304 (FIG. 9) including service modules, e.g., computer readable multimedia modules, for facilitating the servicing of equipment of a group of equipment that includes a selected piece of equipment. The group of equipment may include a group of similar equipment, such as trucks, locomotives, etc. Step 206 allows to provide a respective identifier for uniquely identifying any selected equipment, such as Vehicle Identifier Number (VIN), or Road Number, etc. Step 207 allows to provide an input/output device 306 to communicate with databases 302 and 304. Respective accessing steps 208 and 210, allow to access the database 302 having configuration data to interface with the detailed system configuration data, and the database 304 having the service modules to interface with at least one of the service modules. Configuration data about the selected equipment, using the respective identifier for the equipment, is communicated from the database including detailed system configuration data to the input/output device. In this manner, service personnel 308 at a service site may access the detailed configuration data to select a service action appropriate for the system configuration of the selected piece of equipment, and may access a service module for the system configuration of the selected piece of equipment to facilitate taking such service action.

As suggested above, the input/output device 306 in one exemplary embodiment may communicate with any of the databases 302 and 304 via wireless communications. It will be appreciated that the configuration data and/or service modules for the selected equipment may be downloaded to the input/output device, or interface with the configuration data and/or service modules may be achieved through the input/output device while the detailed configuration data and/or service modules are resident in their respective databases. By way of example, the service module may include troubleshooting, training, supply of replaceable parts and tools for performing any selected service action. Database 302 may be updated upon completion of the service action to reflect any changes to the system configuration of the serviced equipment. It will be understood that the detailed system configuration data may be expanded to include data indicative of the respective configurations of any subsystems and replaceable parts of any selected system of the selected equipment, including respective hardware and software configurations of such equipment.

Figure 10:
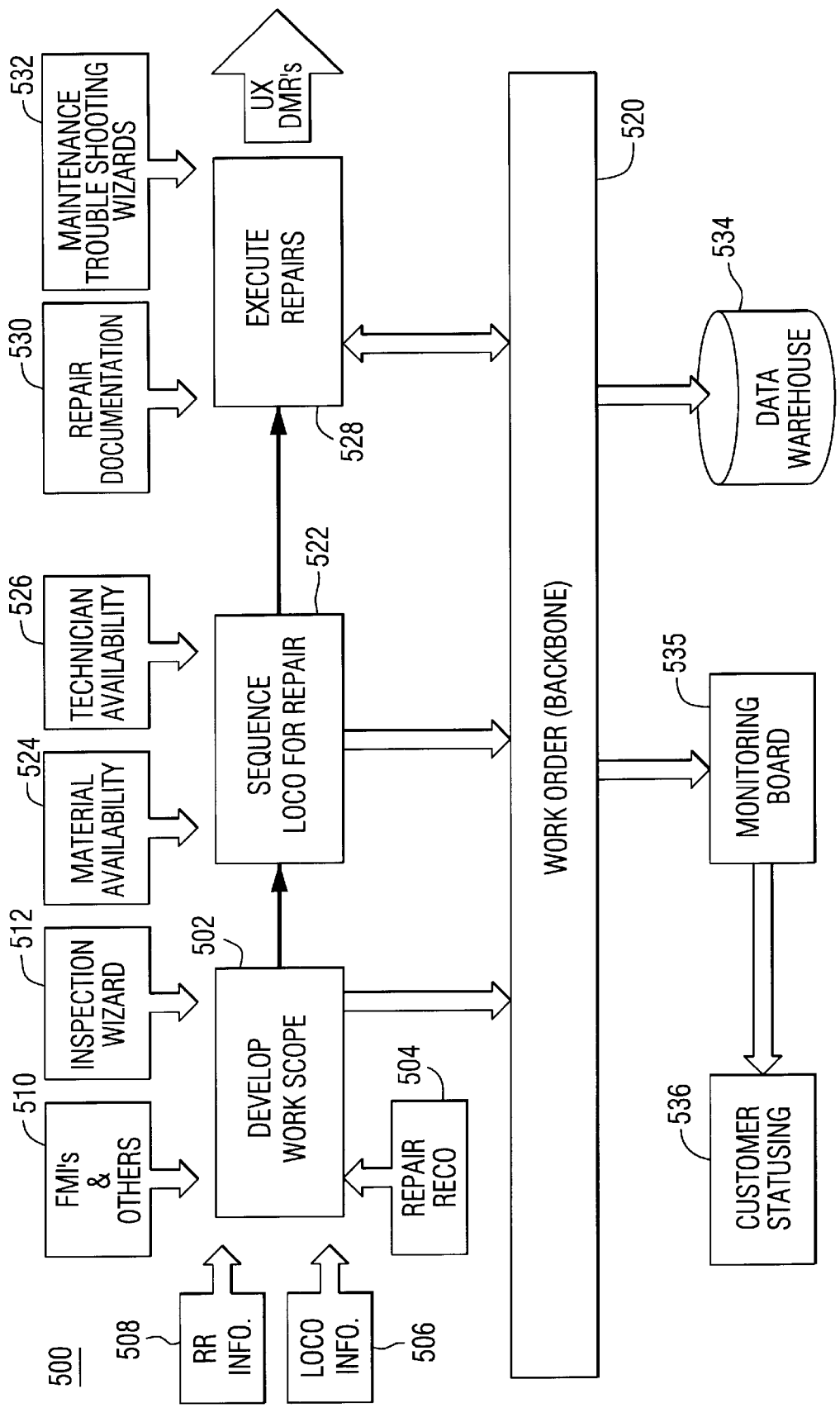
FIG. 10 illustrates a process flow chart showing operational details of aspects of the present invention.

FIG. 10 illustrates an exemplary work-flow module 500 embodying aspects of the present invention to control various processes associated with implementing a repair or service recommendation. The first step of the work order module 500 is the development of a work scope at a step 502. The development of the work scope is influenced by certain tasks and processes input to a work order. For example, a repair recommendation 504, locomotive specific information 506, railroad specific information 508, field modification instructions and other recommendations requiring implementation 510 and an inspection wizard 512, the use of which may identify and add additional items to the work scope 502. The work scope information is input to a work order backbone 520 for creating a work order to implement the various tasks associated with the work scope 502. In preparing the work order, the cycle time associated with each task must be considered. Additionally, consideration must be given to sequencing available locomotives for repair. This information is also input to the work order backbone 520 from a step 522. Factors that influence the repair schedule include material availability as indicated by a step 524 and the availability of other required resources, such as the availability of technicians to implement the repairs as indicated by the reference character 526.

Following the sequencing step 522, the work order is activated and execution of the repair initiated as indicated by a step 528. The technician is directed during the execution of the repair through the portable unit 14 as discussed above. The information displayed on the portable unit 14 directs the step-by-step activities of the technician through the repair process including providing documentation and information from the various databases and modules discussed in conjunction with FIG. 2. This information is indicated by a reference character 530. The technician also utilizes maintenance troubleshooting wizards, identified by a reference character 532 during the repair process. Also as discussed above, data entry objects (feedback) are provided by the technician as the repair progresses. This information is shown as symbolically supplied to the work order backbone 520 and from there stored in a data warehouse 534. Real time repair status information is provided from the work order backbone 520 to a monitoring board 535, which may be located in the service shop 16 or at the service yard 13 for providing information on the status of the various in-process repairs. Further, information as to the repair processes can be supplied directly to a customer either in written form or transmitted electronically for display at a customer site, as shown by a reference character 536. Additionally, the status information generated by the work order backbone 520 can be reviewed and used to improve the reliability of the various locomotive subsystems and further used to improve repair processes across all the service shops and service yards operated by the railroad. Communication of this status information across the railroad network can be efficiently accomplished via satellite communications, a land-based system or through a cellular telephone network.

The present invention can be embodied in the form of computer-implemented processes and apparatus for practicing those processes. The present invention can also be embodied in the form of computer program code including computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. When implemented on a computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A computerized method for communicating information to service personnel for on-site servicing of a selected piece of equipment from a group of generally similar pieces of equipment, with said selected piece of equipment being made up of a plurality of systems and subject to unique system configurations and servicing requirements, said method comprising:

providing a first database including detailed system configuration data regarding a selected piece of equipment;

providing a second database including at least one service module for said system configurations for facilitating the servicing of the selected piece of equipment;

providing a respective identifier for uniquely identifying the selected equipment from among the group of generally similar pieces of equipment;

providing a portable input/output device for service personnel to communicate remotely with said databases from a location adjacent the selected piece of equipment to be serviced via a wireless communication connection;

accessing the first database through the portable input/output device by communicating information indicative of the respective identifier to the first database for the selected piece of equipment through the portable input/output device;

accessing the second database through the portable input/output device by communicating information indicative of the respective identifier for the selected piece of equipment to the second database through the portable input/output device; and communicating via a wireless communication to said service personnel adjacent the selected piece of equipment through the input/output device configuration data about the selected piece of equipment from the first database to select a service action appropriate for the system configuration of the selected piece of equipment, and communicating a service module for the system configuration of the selected piece of equipment to facilitate taking such service action.

2. The computerized method of claim 1 wherein the service module comprises at least one of a troubleshooting module, a training module, and a supply module for providing parts or tools for the service action.

3. The computerized method of claim 1 further comprising updating detailed system configuration data in the first database to reflect any changes to the system configuration of the serviced equipment.

4. The computerized method of claim 1 wherein the detailed system configuration data includes data indicative of the respective configurations of any subsystems and parts thereof in any selected system of the selected equipment.

5. The computerized method of claim 1 wherein the detailed system configuration data is selected from at least one of hardware and software configurations for the selected equipment.

6. A computerized system for communicating information to service personnel for on-site servicing of a selected piece of equipment from a group of generally similar pieces of equipment, with said selected piece of equipment being made up of a plurality of systems and subject to unique system configurations and servicing requirements, said system comprising:

a first database including detailed system configuration data regarding a selected piece of equipment;

a second database including service modules for facilitating the servicing of equipment of a group of equipment that includes a selected piece of equipment;

a respective identifier for uniquely identifying the selected piece of equipment from among the group of generally similar pieces of equipment;

a wireless portable input/output device for service personnel to communicate remotely with said databases from a location adjacent the selected piece of quipment to send and receive information;

with the first database interfacing with the detailed system configuration data when accessed by the portable input/output device delivering information indicative of the respective identifier of the selected piece of equipment to the first database through the portable input/output device;

with the second database interfacing with at least one of the service modules when accessed by portable input/output device delivering information indicative of the respective identifier of the selected piece of equipment to the second database through the portable input/output device; and wherein said service personnel communicates to the datbases through the input/output device using the respective identifier for the equipment for accessing the detailed configuration data to select a service action appropriate for the selected piece of equipment, and accessing a service module for the selected piece of equipment to facilitate taking such service action.

7. The computerized system of claim 6 wherein the service module comprises at least one of a troubleshooting module, a training module, and a supply module for providing parts or tools for the service action.

8. The computerized system of claim 6 wherein the detailed system configuration data in the first database is updated to reflect any changes to the system configuration of the serviced equipment.

9. The computerized system of claim 6 wherein the detailed system configuration data includes data indicative of the respective configurations of any subsystems and parts thereof in any selected system of selected equipment.

10. The computerized method of claim 6 wherein the detailed system configuration data is selected from at least one of hardware and software configurations for the selected equipment.

11. A method for providing information to service personnel for on-site servicing of a selected piece of equipment from a group of generally similar pieces of equipment, with said piece of equipment being made up of a plurality of systems and is subject to unique system configurations and servicing requirements, said method comprising:

providing a wireless portable input/output device for service personnel located adjacent the selected piece of equipment to communicate remotely with a first database having configuration data regarding the piece of equipment and a second data base having service modules for directing the servicing of the equipment;

entering a unique identification for the selected piece of equipment through the input/output device;

retrieving information from the databases through the portable input/output device specific to the selected piece of equipment based on the unique identification;

accessing service modules to select a specific service module based on a service required and the unique identification of the selected piece of equipment through the portable input/output device; and servicing the piece of equipment using the specific service module provided through the portable input/output device.

12. The method of claim 11 further comprising communicating information through the portable input/output device to order a part needed for the servicing of the selected piece of equipment.

13. The method of claim 11 further comprising, if the equipment is unable to be serviced, communicating information through the portable input/output device to the database with an explanation why the equipment was not serviced.

14. The method of claim 11 wherein servicing the piece of equipment comprises at least one of repairing, maintaining, inspecting, diagnosing and ordering parts for the selected piece of equipment.

15. The method of claim 11 further comprising updating the database to reflect any changes to the system configurations of the selected piece of equipment.

16. The method of claim 11 wherein the information specific to the piece of equipment is downloaded to the portable input/output device.

17. The method of claim 11 wherein the service module is selected from a group comprising troubleshooting, training, ordering parts, supplying parts, ordering tools, supplying tools and reporting work completion for servicing the selected piece of equipment.

18. A system for providing information to service personnel for on-site servicing of a selected piece of equipment from a group of generally similar pieces of equipment, with said piece of equipment being made up of a plurality of systems and is subject to unique system configurations and servicing requirements, said system comprising:

a wireless portable input/output device for service personnel to communicate remotely with databases having configuration data regarding the piece of equipment and service modules for directing the servicing of the equipment;

a unique identification specific to the selected piece of equipment;

databases containing information specific to the pieces of equipment based on their unique identification, including service modules containing information for service required by the plurality of pieces of equipment; and with the service modules being accessed, through the portable input/output device, to select a specific service module based on a service required and the unique system configuration of the selected piece of equipment.

19. The system of claim 18 further comprising communicating information through the portable input/output device to order a part needed for the servicing of the selected piece of equipment.

20. The method of claim 18 wherein the service module is at least one of a troubleshooting module, a training module, an ordering parts module, a supplying parts module, an ordering tools module, a supplying tools module and a reporting work completion module for servicing the selected piece of equipment.

\* \* \* \* \*